(12) United States Patent
Abe et al.

(10) Patent No.: US 10,134,359 B2
(45) Date of Patent: Nov. 20, 2018

(54) DEVICE OR METHOD FOR DISPLAYING IMAGE

(71) Applicant: EIZO Corporation, Ishikawa (JP)

(72) Inventors: Reo Abe, Ishikawa (JP); Masashi Nakao, Ishikawa (JP); Masafumi Higashi, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 6 days.

(21) Appl. No.: 15/252,388

(22) Filed: Aug. 31, 2016

(65) Prior Publication Data

US 2016/0372080 A1 Dec. 22, 2016

Related U.S. Application Data

(63) Continuation of application No. 14/388,610, filed as application No. PCT/JP2012/071861 on Aug. 29, 2012, now abandoned.

(30) Foreign Application Priority Data

Mar. 30, 2012 (JP) ................................. 2012-078891

(51) Int. Cl.
*G09G 5/02* (2006.01)
*H04N 5/66* (2006.01)
(Continued)

(52) U.S. Cl.
CPC .............. *G09G 5/02* (2013.01); *G06T 5/008* (2013.01); *G06T 5/009* (2013.01); *G06T 5/20* (2013.01);
(Continued)

(58) Field of Classification Search
CPC ...................................................... G06T 5/008
(Continued)

(56) References Cited

U.S. PATENT DOCUMENTS

| 6,941,028 B2 | 9/2005 | Kimmel et al. | |
| 2005/0013506 A1* | 1/2005 | Yano | G06T 5/009 |
| | | | 382/274 |
| 2007/0182830 A1* | 8/2007 | Katagiri | H04N 5/235 |
| | | | 348/222.1 |

(Continued)

FOREIGN PATENT DOCUMENTS

| EP | 2061233 A1 | 5/2009 |
| JP | 2005-515515 A | 5/2005 |

(Continued)

OTHER PUBLICATIONS

Russian Office Action dated Sep. 20, 2016, in connection with corresponding RU Application No. 2014137568/08(060902) (15 pgs., including English translation).

(Continued)

*Primary Examiner* — Thomas J Lett
(74) *Attorney, Agent, or Firm* — Maier & Maier, PLLC

(57) ABSTRACT

Improving the visibility of the dark portion and to prevent the degradation of image quality caused by excessive correction. A reflectance calculation unit is storing a parameter RGain for adjusting the amplitude of a reflectance component R. An illumination light correction unit generates a corrected illumination light component L1 from an illumination light component L and a formula L1=(log(LAmp*L+1))/(log(LAmp+1)). An image resynthesis unit obtains a corrected illumination light component L' from L'=LGain*L1+(1-LGain)*L. The image resynthesis unit also calculates a corrected image Iout from the corrected illumination light component L' and the corrected reflectance R', as well as from a formula Iout=exp(log L'+RGain (log I-log L)). The value of the corrected illumination light component (L') is determined based on the ratio (LGain) at which the output value of the correction function (L1) and the original illumination light component (L) are combined.

12 Claims, 4 Drawing Sheets

(51) Int. Cl.
*G06T 5/00* (2006.01)
*G06T 5/20* (2006.01)
*H04N 9/68* (2006.01)

(52) U.S. Cl.
CPC ................ *H04N 5/66* (2013.01); *H04N 9/68* (2013.01); *G06T 2207/20208* (2013.01); *G09G 2320/066* (2013.01); *G09G 2320/0626* (2013.01); *G09G 2320/0673* (2013.01)

(58) Field of Classification Search
USPC ....................................................... 345/590
See application file for complete search history.

(56) References Cited

U.S. PATENT DOCUMENTS

| | | | |
|---|---|---|---|
| 2008/0056567 | A1 | 3/2008 | Kwon et al. |
| 2010/0020205 | A1 | 1/2010 | Ishida et al. |
| 2010/0303372 | A1* | 12/2010 | Zhao ............... H04N 1/409 382/254 |

FOREIGN PATENT DOCUMENTS

| | | |
|---|---|---|
| JP | 2007-174482 A | 7/2007 |
| JP | 2010-283690 A | 12/2010 |
| JP | 2012-010227 A | 1/2012 |

OTHER PUBLICATIONS

Extended European Search Report dated May 6, 2016, including the Supplementary Partial European Search Report and the European Search Opinion, in connection with corresponding EP Application No. 12872320.2 (13 pgs.).

Doo Hyun Choi, et al., "Color Image Enhancement Using Single-Scale Retinex Based on an Improved Image Formation Model", in the 16th European Signal Processing Conference (EUSIPCO 2008), Lausanne, Switzerland, Aug. 25-29, 2008, 5 pgs.

Deepak Ghimire, et al., "Nonliear Transfer Function-Based Local Approach for Color Image Enhancement", in IEEE Transactions on Consumer Electronics, vol. 57, No. 2, May 2011, pp. 858-865.

Yongqui Tu, et al., "Illumination Removal in Color Images Using Retinex Method Based on Advanced Adaptive Smoothing", in the 2010 International Conference on E-Health Networking, Digital Ecosystems and Technologies, pp. 219-223.

Ron Kimmel, et al., "A Variational Framework for Retinex", in the International Journal of Computer Vision, 52(1), 2003, pp. 7-23.

Daniel J. Jobson, et al., "Properties and Performance of a Center/Surround Retinex", in IEEE Transactions on Image Processing, vol. 6, No. 3, Mar. 1997, pp. 451-462.

International Search Report dated Dec. 4, 2012 from corresponding International Patent Application No. PCT/JP2012/071861; 3 pgs.

* cited by examiner

DEVICE OR METHOD FOR DISPLAYING IMAGE

TECHNICAL FIELD

The present invention relates to Retinex processing in an image display device and in particular to adjustment of gradation conversion strength.

BACKGROUND ART

Image processing based on the Retinex theory is known as a method for compressing the dynamic range of an imaging device. Since the dynamic range of an imaging device is smaller than the dynamic range of the natural world, the dynamic range is compressed by separating, compressing, and resynthesizing an illumination light component on the basis of the Retinex theory.

Single-scale Retinex (SSR) is known as a type of image processing based on the Retinex theory. In the Retinex theory, incident light I is defined as the product of illumination light L and reflectance R (I=RL). Based on this formula, log R in logarithmic space is used as the output value of the image (see paragraph 0007 of Patent Document 1).

$$\log R = \log I - \log L$$

The above formula shows that, assuming that corrected illumination light L' is a uniform illumination light environment (L'=1), an output value I'=R is converted into logarithmic space which is easy to visually recognize. Thus, it is possible to obtain a value from which the influence of changes in the illumination light has been eliminated.

PRIOR ART DOCUMENTS

Patent Documents

Patent Document 1: Japanese Unexamined Patent Application Publication (Translation of PCT Application) No. 2005-515515

SUMMARY OF THE INVENTION

Problems to be Solved by the Invention

For display devices, however, the input image does not exceed the allowable dynamic range. Accordingly, use of the technique described above disadvantageously causes excessive correction, thereby degrading image quality.

The present invention has been made to solve the above problem, and an object thereof is to provide an image display device or image display method which can prevent degradation of image quality caused by excessive correction while improving the visibility of the dark portion, as well as can automatically adjust gradation conversion strength.

Means for Solving the Problems (1) An image display device of the present invention is an image display device for generating output image data by correcting an input image on the basis of Retinex theory and comprises:
separation means configured to separate the input image into an illumination light component and a reflected-light component using a filter;
corrected illumination light component calculation means configured to calculate a corrected illumination light component by adjusting the separated illumination light component using a brightness adjustment parameter;
corrected reflectance calculation means configured to calculate corrected reflectance by adjusting the separated reflected-light component using a reflectance adjustment parameter; and
generation means configured to generate the output image data on the basis of the corrected illumination light component and the corrected reflectance.

By adjusting the reflected-light component as described above, the amplitude of reflectance can be increased even when a small filter is used.

(2) In the image display device of the present invention, the corrected illumination light component calculation means adjusts the degree of enhancement of a low-gradation component of the separated illumination light component using a parameter for adjusting the degree of enhancement of the low-gradation component of the illumination light component and subsequently calculates the corrected illumination light component by determining, on the basis of the brightness adjustment parameter, a ratio at which the low-gradation component-adjusted illumination light component and the illumination light component separated by the separation means are combined and summed up. By calculating the corrected illumination light component by combining the two kinds of illumination light components as described above, more natural corrected illumination light component can be obtained.

(3) An image display device of the present invention is an image display device for generating output image data by correcting an input image on the basis of Retinex theory and comprises:
separation means configured to separate the input image into an illumination light component and a reflected-light component using a filter;
corrected illumination light component calculation means configured to calculate a corrected illumination light component by adjusting the separated illumination light component using an illumination light component brightness adjustment parameter; and
generation means configured to generate the corrected input image on the basis of the corrected illumination light component, wherein
the corrected illumination light component calculation means adjusts the degree of enhancement of a low-gradation component of the separated illumination light component using a parameter for adjusting the degree of enhancement of the low-gradation component of the illumination light component and subsequently calculates the corrected illumination light component by determining, on the basis of the brightness adjustment parameter, a ratio at which the low-gradation component-adjusted illumination light component and the illumination light component separated by the separation means are combined and summed up.

By combining and summing up the yet-to-be-corrected illumination light component and the corrected illumination light component as described above, more natural visibility improvement effects can be obtained.

(4) In the image display device of the present invention, the corrected illumination light component calculation means calculates an average representative value of luminance for each pixel in a particular region of the input image, and when the average representative value is high, the corrected illumination light component calculation means combines and sums up the illumination light component and the low-gradation component-enhanced illumination light component in such a manner that a content of the low-gradation component-enhanced illumination light component is low. By lowering the content of the low-gradation component-enhanced illumination light component when the average is high, excessive correction can be prevented.

(5) In the image display device of the present invention, the corrected illumination light component calculation means calculates the degree of variation of luminance for each pixel in a particular region of the input image, and when the degree of variation is small, the corrected illumination light component calculation means combines and sums up the illumination light component and the low-gradation component-enhanced illumination light component in such a manner that a content of the low-gradation component-enhanced illumination light component is low.

By lowering the content of the low-gradation component-enhanced illumination light component when the degree of variation is small, as described above, it is possible to prevent an image which is distributed intensively at a particular gradation from becoming difficult to see when the gradation of the image is corrected.

For example, the corrected illumination light component L' may be calculated using Formula (1) below.

$$L'=LGain*L1+(1-LGain)*L \quad \text{Formula (1)}$$

where L' represents the corrected illumination light component; L1 represents the low-gradation component-enhanced illumination light component; L represents the illumination light component; and $0 \leq LGain \leq 1$.

By only changing LGain described above, the illumination light component and the low-gradation component-enhanced illumination light component can be properly combined.

The image display device of the present invention further comprises corrected reflectance calculation means configured to calculate corrected reflectance by adjusting the separated reflected-light component using a reflectance adjustment parameter, wherein the corrected illumination light component calculation means generates the output image data on the basis of the corrected illumination light component and the corrected reflectance. By adjusting the reflected-light component as described above, the amplitude of reflectance can be increased even when a small filter is used.

(7) In the image display device of the present invention, the reflectance adjustment parameter is set such that the reflectance adjustment parameter is reduced as a scale of a low-pass filter used in the separation step is increased and such that the reflectance adjustment parameter is reduced as resolution of a display monitor is reduced.

Thus, the amplification can be performed according to the size of the low-pass filter. Further, when the resolution of the monitor is reduced, the amplitude can be reduced.

(8) An image display device of the present invention is an image display device for generating output image data by correcting an input image on the basis of Retinex theory and comprises:

separation means configured to separate an illumination light component from input image data on the basis of values of a pixel of interest and a pixel region adjacent to the pixel of interest; and corrected illumination light component calculation means configured to obtain a low-gradation component-enhanced illumination light component by enhancing a low-gradation component of the illumination light component separated by the separation means and to calculate a corrected illumination light component by combining and summing up the low-gradation component-enhanced illumination light component and the illumination light component, wherein the corrected illumination light component calculation means calculates an average representative value of luminance and/or the degree of variation of luminance for each pixel in a particular region of the input image, and wherein when the average representative value is high and/or when degree of variation is low, the corrected illumination light component calculation means combines and sums up the illumination light component and the low-gradation component-enhanced illumination light component in such a manner that a content of the low-gradation component-enhanced illumination light component is low.

Thus, when the average is high, the content of the low-gradation component-enhanced illumination light component can be reduced, and/or it is possible to prevent an image which is distributed intensively at a high gradation from becoming difficult to see when the gradation of the image is corrected.

(9) In the image display device of the present invention, the input image data is moving-image data comprising a plurality of frames, the average representative value and/or degree of variation of the luminance are calculated for each frame, and when the average representative value is high and/or when degree of variation are low, the illumination light component and the low-gradation component-enhanced illumination light component are combined and summed up in such a manner that a content of the low-gradation component-enhanced illumination light component is low. Thus, natural corrected illumination light components of moving images can also be obtained.

Note that while the V value in HSV color space is used as the "luminance" in the present description, not only the V value but also changes in luminance caused by the backlight may be considered.

The "average representative value" may be a simple average, a median value in a gradation range greater than or equal to a threshold in a histogram, a mode in a histogram, or the like.

The "degree of variation" may be of any kind as long as the degree of variation represents variations in the distribution of luminance. Examples of the degree of variation include variance, the width of a gradation range meeting a given value or more, the total sum of the difference values between variations and the average representative value, and entropy calculated from a distribution of luminance (histogram). The "difference value" may be L2 norm (the square of the difference) or L1 norm (the absolute value of the difference).

While the "low-gradation component-adjusted illumination light component" is calculated using Formula (2) in an embodiment, it may be calculated by other means.

As for "combine and sum up," in the embodiment, one value is between 0 and 1 and the other value is obtained by subtracting the one value from 1. In addition, one or both of these values may be multiplied by a coefficient.

While "the particular region of the input image" refers to the entire input image in the embodiment, it may be part thereof. If the particular region of the input image is part thereof, for example, the moving image frame or the like of the input image may be detected, or the user may specify the particular region.

EMBODIMENTS

An embodiment of the present invention will be described with reference to the drawings.

1. Outline

Figure 1:
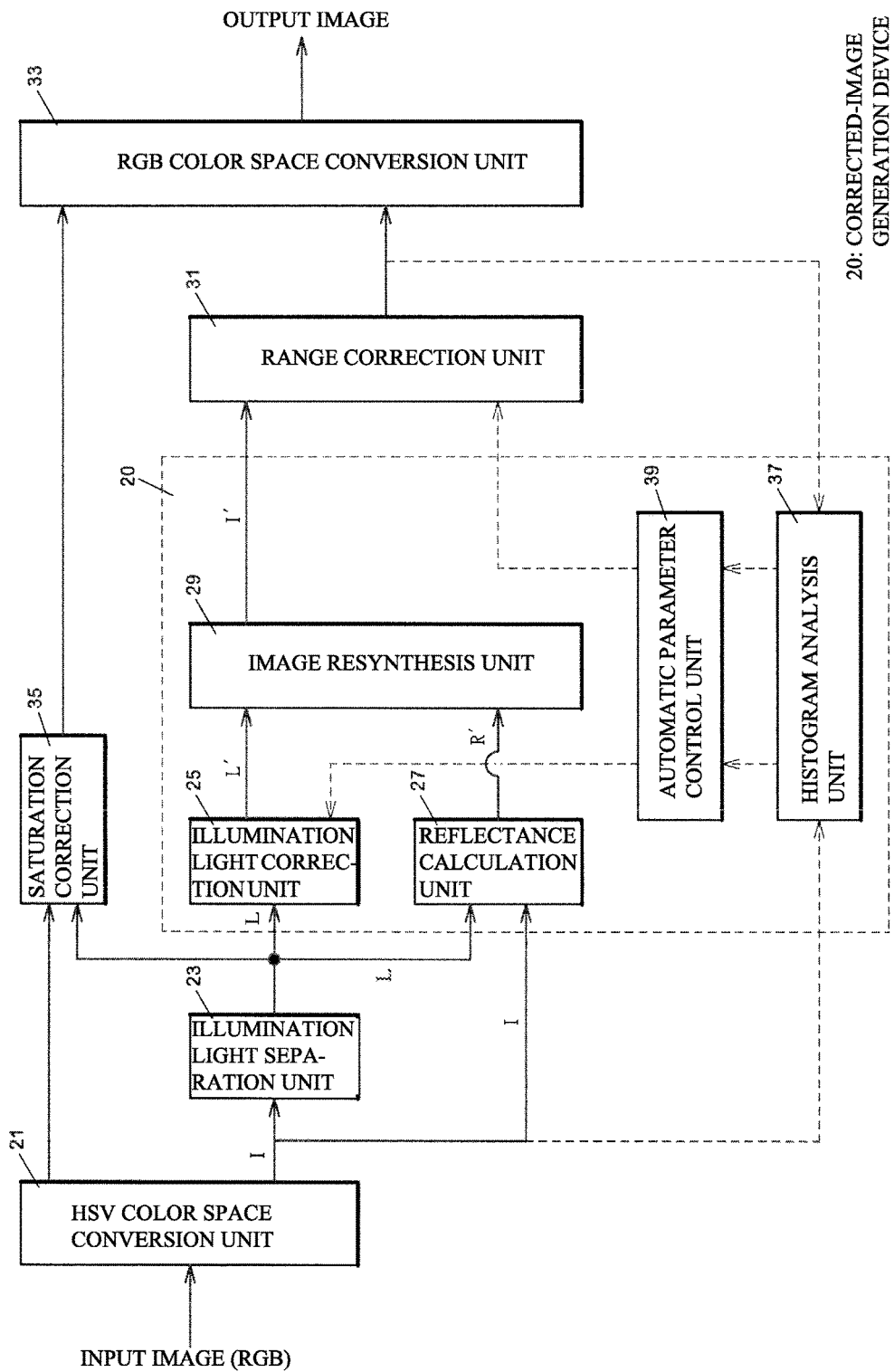
FIG. 1 is a block diagram of an image display device.

FIG. 1 shows a schematic diagram of an image display device including a corrected-image generation device 20 according to the present embodiment. In the present embodiment, an illumination light correction unit 25, a reflectance calculation unit 27, an image resynthesis unit 29, an automatic parameter control unit 39, a histogram analysis unit 37 form a gradation correction device.

An HSV color space conversion unit 21 converts RGB color space into HSV color space. The HSV color space is converted into the RGB color space using a typical conversion formula. Use of HSV color space allows elimination of saturation reduction effects resulting from the adjustment of brightness using YUV color space and thus visually favorable correction of brightness.

An illumination light separation unit 23 is an edge-preserving low-pass filter and calculates the weighted average of local brightness, that is, an illumination light component. A histogram analysis unit 37 generates a 32-step gradation histogram on the basis of the V components of the input image and output image in HSV space and calculates the feature value of the entire image. The automatic parameter control unit 39 determines the parameter of the corrected amount of illumination light on the basis of the feature value of the image obtained from the histogram analysis.

An illumination light correction unit 25 corrects the low-gradation region of the illumination light component on the basis of the parameter value of the corrected amount of illumination light provided by the automatic parameter control unit 39 and the illumination light component L provided by the illumination light separation unit 23.

The reflectance calculation unit 27 calculates reflectance from the logarithmic difference between the illumination light component obtained by the illumination light separation unit 23 and reflected-light component (input V values). It then outputs the calculated reflectance as it is.

The image resynthesis unit 29 calculates a corrected image from the corrected illumination light component calculated by the illumination light correction unit 25 and the reflectance component (the reflectance) calculated by the reflectance calculation unit 27. A range correction unit 31 corrects the range of the V component of the image on the basis of the parameter value of the amount of range correction. While the illumination light correction unit 25 corrects local brightness, the range correction unit 31 corrects the brightness of the entire image. Thus, the contrast of the entire image can be optimized.

The histogram analysis unit 37 generates a 32-step gradation histogram from the V value corrected by the range correction unit 31, calculates the feature value of the entire image, and provides the feature value to the automatic parameter control unit 39. The automatic parameter control unit 39 determines the parameter of the amount of range correction on the basis of the feature value provided.

A saturation correction unit 35 corrects the saturation of the low-gradation region. In the present embodiment, the saturation correction unit 35 selects between enhancement and reduction to correct the saturation of the low-gradation region.

An RGB color space conversion unit 33 converts the HSV color space into the RGB color space.

2. Details

Referring to FIG. 1, details of the corrected-image generation device 20 will be described.

The reflectance calculation unit 27 is storing a parameter RGain for adjusting the amplitude of reflectance component R. The significance of the parameter RGain will be described. Effects of Retinex calculation are produced by R, which is the logarithmic difference between the value I of the target pixel (reflected-light component) and the local average L of pixels (illumination light components) adjacent to the target pixel. For example, if the size of the low-pass filter is 1*1, L equals I, and R is always 1. If the size of the low-pass filter is increased, the shape of R changes to an undulating waveform centered on 1. The sizes (diameters) of low-pass filters which have been used in the traditional Retinex theory are as wide as several tens of pixels to several hundred pixels. However, if low-pass filters having such sizes are used in a monitor, the cost increases in proportion to the square of the filter size. For this reason, a parameter RGain is used as a coefficient of log R so that the visual effects of Retinex can be increased or reduced even when the filter size is small.

If the parameter RGain is set so that 1<RGain, the amplitude of the waveform of the reflectance component R is increased. Thus, effects as if the filter size were increased (effects where local contrast appears to be enhanced) can be obtained.

As an additional function, if the parameter RGain is set so that 0<RGain<1, it is possible to output an image whose local contrast is suppressed and whose outline looks vague.

After calculating the reflectance R from the logarithmic difference between the illumination light component obtained by the illumination light separation unit 23 and reflectance component (input V values), the reflectance R is gain-adjusted to obtain a corrected reflectance R', which is then outputted. The corrected reflectance R' is obtained using Formula (1) below.

$$R' = (I/L)^{RGain} \quad \text{Formula (1)}$$

This formula can be derived from $\log R' = RGain * \log R$ and $R = (I/L)$.

The illumination light correction unit 25 obtains a corrected illumination light component L1 from the parameter value of the corrected amount of illumination light provided by the automatic parameter control unit 39 and the illumination light component L provided by the illumination light separation unit 23. In the present embodiment, the corrected illumination light component L1 is calculated using Formula (2) below.

$$L1 = (\log(LAmp * L + 1))/(\log(LAmp + 1)) \quad \text{Formula (2)}$$

The parameter LAmp adjusts the degree of enhancement of the low-gradation portion of the illumination light component. In the present embodiment, a typical log curve formula is used to enhance the low-gradation portion as naturally as possible.

Figure 2:
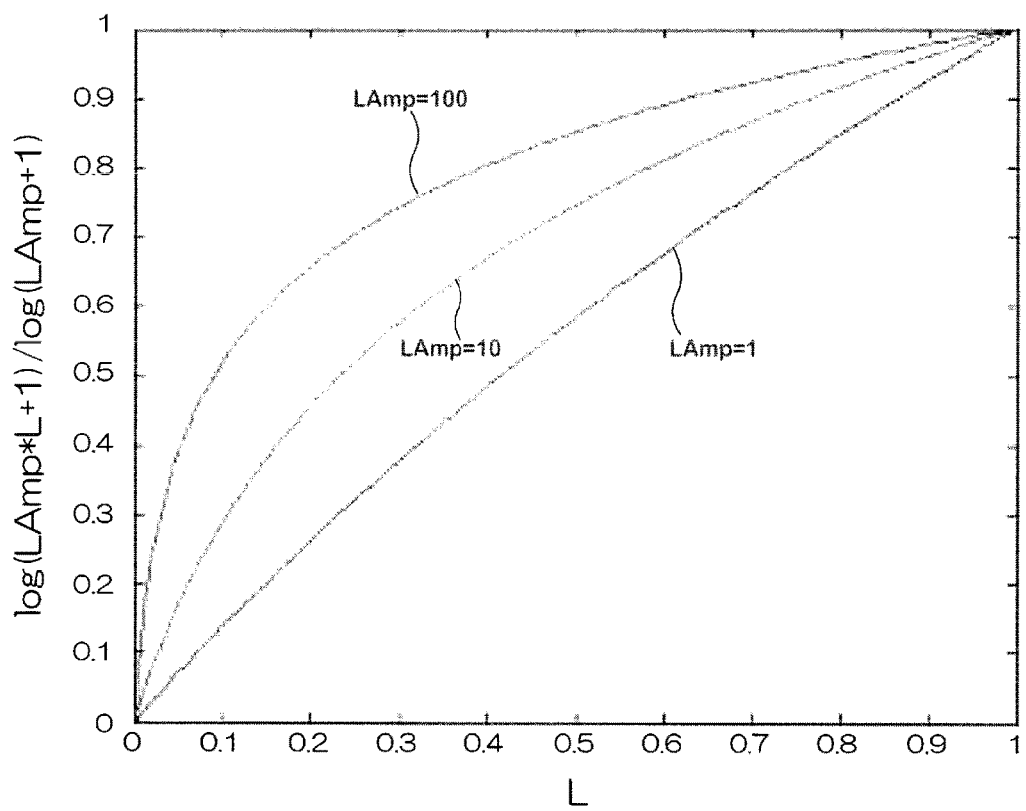
FIG. 2 is a diagram showing the correspondence between an illumination light component L and a corrected illumination light component L1.

FIG. 2 shows the correspondence between the illumination light component L and the corrected illumination light component L1 when the parameter LAmp is changed. As the parameter LAmp is increased, the low-gradation portion rises faster and the illumination light component is corrected so that it becomes brighter. On the other hand, as the parameter LAmp is brought close to 1, the value of the corrected illumination light component L1 becomes asymptotic to the illumination light component L. Thus, the illumination light component correction effects are lost.

The parameter LAmp may be determined depending on the gamma characteristics of the panel used, the amount of light of the backlight, or ambient light (surface reflection luminance). The reason is as follows. When an image is displayed on the monitor, the low-gradation portion thereof may be difficult to visually recognize, even if this portion can be seen in the real world (high-illuminance environment). This is because when the image is displayed on the monitor, the dynamic range is compressed. The gradation correction method of the present embodiment is intended to reproduce the original appearance of the image by changing the reflectance R of the low-gradation portion so that the low-gradation portion can be seen. One reason for changing the reflectance R of the low-gradation portion is that the degree of enhancement of the low-gradation portion of the illumination light component depends on the optical input-output characteristics of the monitor. Another reason is that when the ambient light is strong, the surface reflection luminance of the panel is increased, so that the low-gradation portion becomes difficult to see.

Note that the parameter LAmp may be dynamically adjusted according to a histogram of the input image, or the like.

The image resynthesis unit 29 (see FIG. 1) combines and sums up the corrected illumination light component L1, where the low-gradation component is enhanced, and the original the illumination light component L to calculate a corrected illumination light component L'. In the present embodiment, L' is calculated using Formula (3) below.

$$L'=L\text{Gain}*L1+(1-L\text{Gain})*L \quad\quad \text{Formula (3)}$$

The significance of the parameter LGain is described below. The parameter LGain is a parameter for determining the combination ratio at which a gradation-corrected image and the original image are combined. Even if application of SSR to the monitor is considered, there is no need to extremely correct the image as seen in SSR. Rather, the appearance (contrast) of the image must be maintained to some extent. Further, the degree of correction can be preferably adjusted, and when the image is corrected to the least degree, the resulting image preferably becomes asymptotic to the original image. For this reason, in the present embodiment, the value of the corrected illumination light component (L') is determined based on the ratio (LGain) at which the output value (L1) of the correction function and the original illumination light component (L) are combined. As a result, when LGain is 0, L' becomes L, and the resulting image becomes asymptotic to the original image. On the other hand, when LGain is 1, L becomes L1, and the image is corrected most brightly.

Further, since brightness is seamlessly adjusted by using LGain, this parameter can be used without causing the feeling of strangeness to the viewer even when the parameters vary from moment to moment in moving-image processing or the like.

Next, the calculation process in the image resynthesis unit 29 (see FIG. 1) will be described. The image resynthesis unit 29 calculates a corrected image Tout using Formula (4) on the basis of the corrected illumination light component L' calculated by the illumination light correction unit 25 and the corrected reflectance R' calculated by the reflectance calculation unit 27.

$$I\text{out}=\exp(\log L'+R\text{Gain}(\log I-\log L)) \quad\quad \text{Formula (4)}$$

Formula (4) above is derived from the formulas below.

In the Retinex theory, I=RL. In the present invention, the corrected reflectance component R' and corrected illumination light component L' are obtained by correcting the reflectance component R and the illumination light component L, respectively.

Accordingly, the corrected output Tout is represented by R'L'. Here, log R'=RGain*log R. Accordingly, R'=(I/L)^RGain. Accordingly, Iout=R'L' is represented by Iout=(I/L)^RGain*L'. This is exponentially represented by Formula (4) above.

As seen above, the three parameters, LAmp, RGain, and LGain, are used in the present embodiment. Thus, even a small-size filter can generate the output image Tout whose appearance (contrast) is maintained to some extent and whose dark portion has improved visibility.

Next, adjustment of the parameter LGain by the histogram analysis unit 37 will be described.

For the above correction by controlling the parameter LGain, if the parameter LGain is adjusted so that the degree of gradation correction is reduced, adverse effects of gradation correction are reduced.

1) For an image which is distributed intensively near a particular gradation, the variance value is small. Accordingly, visibility improvement effects are not obtained.

2) For an image which is distributed intensively at a particular gradation, such as a whitish image which is distributed intensively at a high gradation, it becomes difficult to see when the gradation thereof is corrected.

Figure 3:
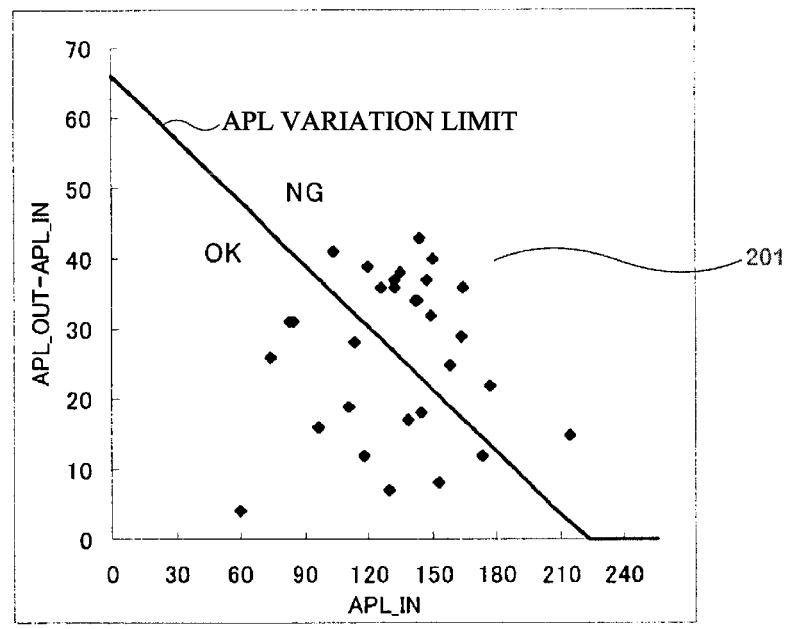
FIG. 3 is a graph showing a limit on the corrected illumination light component based on an "average representative value."
Figure 4:
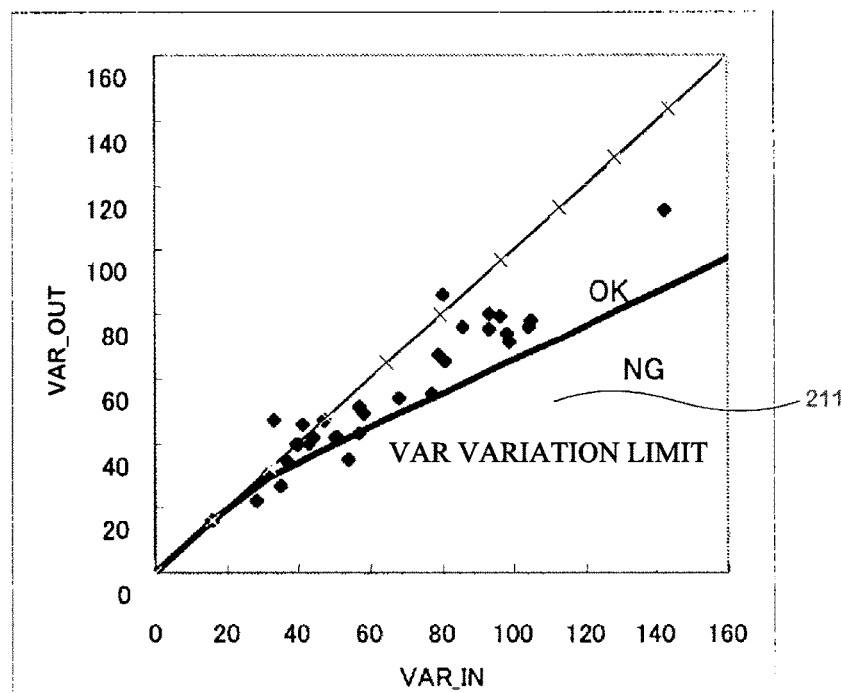
FIG. 4 is a diagram showing a limit on the corrected illumination light component based on "variance."

Details are described below. FIGS. 3 and 4 are graphs obtained by plotting the average (APL) and variance (VAR), respectively, of various input images when the LGain values of the input images are adjusted so that the input images become visually preferable.

In FIG. 3, the horizontal axis represents the average luminance of the input image (APL_IN), and the vertical axis represents the difference between the average luminance of the output image and that of the input image ((APL_OUT)−(APL_IN)). In FIG. 4, the horizontal axis represents the variance (VAR_IN) of the input image, and the vertical axis represents the variance of the output image (VAR_OUT).

The following is evident from FIG. 3:

1) When the average luminance of the input image is originally high, it is preferable to reduce the value of the parameter LGain and thus to reduce the average luminance of the output.

On the other hand, the VAR value of the input image typically tends to decrease when the gradation of the input image is corrected. Accordingly, the following is evident from FIG. 4:

2) For a scene where the VAR value is low, for example, an input image which is distributed unevenly at a particular gradation, the degree of gradation correction needs to be reduced.

With respect to the above 1), the present embodiment increases the variance by stretching (expanding) the luminance component. Thus, the value of the parameter LGain is increased, so that visibility improvement effects are maximized.

With respect to the above 2), the present embodiment controls the parameter LGain for an image which is distributed intensively at a particular gradation so that the value of the parameter LGain is reduced. Thus, the gradation of the output is prevented from becoming higher.

By performing such control, it is possible, as gradation correction effects, to improve the visibility of the low-gradation portion, as well as to further optimize the contrast of the entire image.

Specifically, for the average luminance, an APL variation limit as shown in FIG. 3 is set thereon, and when the correspondence between the average luminance of the input image (APL_IN) and the average luminance of the output image (APL_OUT) falls into a region 201 exceeding the APL variation limit, the parameter LGain is adjusted so that the correspondence falls within the APL variation limit. As for the variance, a VAR variation limit shown in FIG. 4 is set thereon, and if the output variance does not fall within a region 211 which is less than the VAR variation limit, the VAR variation limit is used as the upper limit. Note that LGain corresponding to the upper limit of the APL variation limit may be previously calculated and stored as a correspondence table. The same applies to the VAR variation limit.

The APL variation limit APL_LIMIT and the VAR variation limit VAR_LIMIT may be determined using Formulas (5) and (6), respectively.

$$APL\_LIMIT = \max(0, iAPL\_LIMIT\_OFFSET - iAPL\_IN*(iAPL\_LIMIT\_GAIN/256)) \quad \text{Formula (5)}$$

where iAPL_LIMIT_OFFSET and iAPL_LIMIT_GAIN each represent a fixed value, and iAPL_IN represents the average value of the target region of the input image.

That is, if iAPL_LIMIT_OFFSET−iAPL_IN*(iAPL_LIMIT_GAIN/256) is smaller than zero, APL_LIMIT is 0; otherwise, it is expressed as a first-order decreasing function iAPL_LIMIT_OFFSET−iAPL_IN*(iAPL_LIMIT_GAIN/256).

$$VAR\_LIMIT = \min(iVAR\_IN, iVAR\_LIMIT\_OFFSET + iAPL\_IN*(iVAR\_LIMIT\_GAIN/256)) \quad \text{Formula (6)}$$

where iVAR_LIMIT_OFFSET and iVAR_LIMIT_GAIN each represent a fixed value, and iVAR_IN represents the variance of the target region of the input image.

That is, VAR_LIMIT is iVAR_IN until iVAR_IN exceeds iVAR_LIMIT_OFFSET+iAPL_IN*(iVAR_LIMIT_GAIN/256); and once exceeded, VAR_LIMIT becomes iVAR_LIMIT_OFFSET+iAPL_IN*(iVAR_LIMIT_GAIN/256).

The average and variance may be calculated using a typical calculation method.

3. Other Embodiments

While the case where the image is a still image has been described in the above embodiment, the present invention is also applicable to moving images where the input image changes from moment to moment.

While the value in HSV color space is used as the pixel value in the above embodiment, the lightness in HLS color space may be used. An RGB value or YUV value may also be used.

While the size of the LPF is fixed in the above embodiment, the LPF size may be adjusted, that is, may be increased or reduced so that the filter effects are optimized when the input resolution is changed.

The units described above may be realized using any of hardware and software.

The present invention may be interpreted as methods as described in 1) and 2) below.

1) A method for calculating a corrected illumination light component through Retinex processing, comprising: separating an illumination light component from input image data on the basis of values of a pixel of interest and a pixel region adjacent to the pixel of interest;

calculating a low-gradation component-enhanced illumination light component by enhancing a low-gradation component of the separated illumination light component; and calculating a corrected illumination light component by combining and summing up the low-gradation component-enhanced illumination light component and the illumination light component.

2) A method for calculating a corrected illumination light component through Retinex processing, comprising: separating an illumination light component from input image data on the basis of values of a pixel of interest and a pixel region adjacent to the pixel of interest; and calculating a low-gradation component-enhanced illumination light component by enhancing a low-gradation component of the separated illumination light component and calculating a corrected illumination light component by combining and summing up the low-gradation component-enhanced illumination light component and the illumination light component, wherein the calculating step comprises calculating an average representative value and variance of luminance for each pixel in the adjacent pixel region and, as the average representative value becomes higher and/or, when the variance is low, combining and summing up the illumination light component and the low-gradation component-enhanced illumination light component in such a manner that a content of the low-gradation component-enhanced illumination light component is lowered.

DESCRIPTION OF NUMERALS 25 illumination light correction unit
27 reflectance calculation unit
29 image resynthesis unit
37 histogram analysis unit
39 automatic parameter adjustment unit

The invention claimed is:

1. An image display device for generating output image data by correcting an input image, the image display device comprising:

separation means configured to separate an illumination light component from the input image using a filter;

corrected illumination light component calculation means configured to calculate a corrected illumination light component by adjusting the separated illumination light component using an illumination light component adjustment parameter for adjusting brightness of the illumination light component; and generation means configured to generate the output image data on the basis of the corrected illumination light component, wherein the corrected illumination light component calculation means calculates the corrected illumination light component by combining and summing up the illumination light component separated by the separation means and a low-gradation component-enhanced illumination light component, the low-gradation component-enhanced illumination light component being obtained by adjusting the degree of enhancement of a low-gradation component of the illumination light component.

2. The image display device of claim 1, wherein the degree of enhancement of the low-gradation component of the illumination light component is adjusted using an enhancement degree adjustment parameter for adjusting the degree of enhancement of the low-gradation component of the illumination light component.

3. The image display device of claim 1, wherein the input image is frame data forming moving images.

4. The image display device of claim 1,
wherein the corrected illumination light component calculation means calculates an average representative value of luminance in a particular region of the input image, and
wherein when the average representative value is high, the corrected illumination light component calculation means combines and sums up the illumination light component and the low-gradation component-enhanced illumination light component in such a manner that a content of the low-gradation component-enhanced illumination light component is low.

5. The image display device of claim 1,
wherein the corrected illumination light component calculation means calculates the degree of variation of luminance in a particular region of the input image, and
wherein when the degree of variation is small, the corrected illumination light component calculation means combines and sums up the illumination light component and the low-gradation component-enhanced illumination light component in such a manner that a content of the low-gradation component-enhanced illumination light component is low.

6. The image display device of claim 1, further comprising corrected reflectance calculation means configured to calculate reflectance from the separated illumination light component and the input image and to calculate corrected reflectance by adjusting the reflectance using a reflectance adjustment parameter, wherein
the generation means generates the output image data on the basis of the corrected illumination light component and the corrected reflectance.

7. An image display device for generating output image data by correcting an input image, the image display device comprising:
separation means configured to separate an illumination light component from input image data on the basis of values of a pixel of interest and a pixel region adjacent to the pixel of interest;
corrected illumination light component calculation means configured to calculate a corrected illumination light component by combining and summing up the illumination light component separated by the separation means and a low-gradation component-enhanced illumination light component, the low-gradation component-enhanced illumination light component being obtained by adjusting the degree of enhancement of a low-gradation component of the illumination light component, and
generation means configured to generate the output image data on the basis of the corrected illumination light component,
wherein
the corrected illumination light component calculation means calculates an average representative value of luminance in a particular region of the input image, and
wherein when the average representative value is high, the corrected illumination light component calculation means combines and sums up the illumination light component and the low-gradation component-enhanced illumination light component in such a manner that a content of the low-gradation component-enhanced illumination light component is low, and/or,
wherein
the corrected illumination light component calculation means calculates the degree of variation of luminance in a particular region of the input image, and wherein when the degree of variation is small, the corrected illumination light component calculation means combines and sums up the illumination light component and the low-gradation component-enhanced illumination light component in such a manner that a content of the low-gradation component-enhanced illumination light component is low.

8. An image display device for generating output image data by correcting an input image, the image display device comprising:
separation means configured to separate an illumination light component from the input image using a filter;
corrected illumination light component calculation means configured to calculate a corrected illumination light component by adjusting the separated illumination light component using an illumination light component adjustment parameter for adjusting brightness of the illumination light component;
corrected reflectance calculation means configured to calculate reflectance from the separated illumination light component and the input image and to calculate corrected reflectance by adjusting the reflectance using a gain; and
generation means configured to generate the output image data on the basis of the corrected reflectance and the corrected illumination light component, wherein
the corrected illumination light component calculation means calculates the corrected illumination light component by combining and summing up the illumination light component separated by the separation means and a low-gradation component-enhanced illumination light component, the low-gradation component-enhanced illumination light component being obtained by adjusting the degree of enhancement of a low-gradation component of the illumination light component.

9. An image display method for generating output image data by correcting an input image, the method comprising:
separating an illumination light component from the input image using a filter;
calculating a corrected illumination light component by adjusting the separated illumination light component using an illumination light component adjustment parameter for adjusting brightness of the illumination light component; and
generating the output image data on the basis of the corrected illumination light component, wherein
the corrected illumination light component calculation means calculates the corrected illumination light component by combining and summing up the illumination light component separated by the separation means and a low-gradation component-enhanced illumination light component, the low-gradation component-enhanced illumination light component being obtained by adjusting the degree of enhancement of a low-gradation component of the illumination light component.

10. The image display method of claim 9, wherein the degree of enhancement of the low-gradation component of the illumination light component is adjusted using an enhancement degree adjustment parameter for adjusting the degree of enhancement of the low-gradation component of the illumination light component.

11. An image display method for generating output image data by correcting an input image, the method comprising:
    separating an illumination light component from input image data on the basis of values of a pixel of interest and a pixel region adjacent to the pixel of interest;
    calculating a low-gradation component-enhanced illumination light component by combining and summing up the illumination light component separated in the separation step and a low-gradation component-enhanced illumination light component, the low-gradation component-enhanced illumination light component being obtained by adjusting the degree of enhancement of a low-gradation component of the illumination light component,
    calculating an average representative value of luminance and/or the degree of variation of luminance for each pixel in a particular region of the input image;
    when the average representative value is high and/or when the degree of variation is low, combining and summing up the illumination light component and the low-gradation component-enhanced illumination light component in such a manner that a content of the low-gradation component-enhanced illumination light component is low, the step of combining and summing up the illumination light component and the low-gradation component-enhanced illumination light component yielding a corrected illumination light component; and
    generating output image data on the basis of the corrected illumination light component.

12. An image display method for generating output image data by correcting an input image, the method comprising:
    separating an illumination light component from input image using a filter;
    calculating a corrected illumination light component by adjusting the separated illumination light component using an illumination light component adjustment parameter for adjusting brightness of the illumination light component;
    calculating reflectance from the separated illumination light component and the input image and calculating corrected reflectance by adjusting the reflectance using a gain; and
    generating the output image data on the basis of the corrected reflectance and the corrected illumination light component, wherein
    the corrected illumination light component calculation means calculates the corrected illumination light component by combining and summing up the illumination light component separated by the separation means and a low-gradation component-enhanced illumination light component, the low-gradation component-enhanced illumination light component being obtained by adjusting the degree of enhancement of a low-gradation component of the illumination light component.

* * * * *